US012768656B2

(12) United States Patent
Lissick et al.

(10) Patent No.: US 12,768,656 B2
(45) Date of Patent: *Oct. 20, 2026

(54) MAP ACCURACY

(71) Applicant: Target Brands, Inc., Minneapolis, MN (US)

(72) Inventors: Michael Lissick, Minneapolis, MN (US); Eric Runquist, Minneapolis, MN (US); Clayton Black, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 76 days.

This patent is subject to a terminal disclaimer.

(21) Appl. No.: 18/986,303

(22) Filed: Dec. 18, 2024

(65) Prior Publication Data

US 2025/0198767 A1 Jun. 19, 2025

Related U.S. Application Data

(63) Continuation of application No. 17/874,780, filed on Jul. 27, 2022, now Pat. No. 12,209,870, which is a continuation of application No. 16/831,111, filed on Mar. 26, 2020, now Pat. No. 11,425,533.

(60) Provisional application No. 62/824,389, filed on Mar. 27, 2019.

(51) Int. Cl.
*G01C 21/32* (2006.01)
*G06F 16/29* (2019.01)

(52) U.S. Cl.
CPC ............ *G01C 21/32* (2013.01); *G06F 16/29* (2019.01)

(58) Field of Classification Search
None
See application file for complete search history.

(56) References Cited

U.S. PATENT DOCUMENTS

| | | | | |
|---|---|---|---|---|
| 8,983,774 | B2 | 3/2015 | Gao et al. | |
| 9,661,467 | B2 | 5/2017 | Jagannath | |
| 10,636,207 | B1 * | 4/2020 | Swidersky | G01C 21/383 |
| 2011/0007076 | A1 * | 1/2011 | Nielsen | G06F 16/2365 345/441 |
| 2014/0344118 | A1 * | 11/2014 | Parpia | G06Q 10/087 705/28 |
| 2014/0347492 | A1 | 11/2014 | Fales | |
| 2015/0088703 | A1 * | 3/2015 | Yan | G06F 3/147 705/28 |
| 2015/0169597 | A1 | 6/2015 | Edge et al. | |

(Continued)

OTHER PUBLICATIONS

Aisle411.com [online], “The power of indoor navigation & augmented reality,” 2019, retrieved on Mar. 25, 2020, retrieved from URL <http://aisle411.com/>, 13 pages.

(Continued)

*Primary Examiner* — Daniel L Greene
*Assistant Examiner* — Robert L Pinkerton
(74) *Attorney, Agent, or Firm* — Barnes & Thornburg LLP

(57) ABSTRACT

In some implementations, a method performed by data processing apparatuses includes receiving stored map data corresponding to a digital map, identifying a discrepancy between the digital map and a physical space which the digital map represents, updating the digital map to correct the identified discrepancy, storing the updated digital map, and optionally providing the updated digital may for presentation on a device display.

20 Claims, 8 Drawing Sheets

(56) References Cited

U.S. PATENT DOCUMENTS

| | | | | |
|---|---|---|---|---|
| 2016/0231121 | A1 | 8/2016 | Young et al. | |
| 2016/0234652 | A1 | 8/2016 | Chao | |
| 2016/0371394 | A1 | 12/2016 | Shahidi | |
| 2020/0074371 | A1 | 3/2020 | Bogolea | |
| 2020/0096349 | A1* | 3/2020 | Black | G01C 21/383 |
| 2020/0202593 | A1* | 6/2020 | Black | G06F 16/29 |

OTHER PUBLICATIONS

Alzantot & Youssef, "CrowdInside: Automatic Construction of Indoor Floorplans," Proceedings of the 20th International Conference on Advances in Geographic Information Systems, Nov. 2012, 99-108.

Indooratlas.com [online], "Mapping quick start guide with MapCreator 2," retrieved on Mar. 25, 2020, retrieved from URL <https://docs.indooratlas.com/app/>, 10 pages.

Luo et al., "Constructing an Indoor Floor Plan Using Crowdsourcing Based on Magnetic Fingerprinting," Sensors, Nov. 2017, 17(11):2678, 15 pages.

Pointinside.com [online], "Point Inside Understands Location," retrieved on Mar. 25, 2020, retrieved from URL <http://Pointinside.com>, 4 pages.

Rosser et al., "Modelling of Building Interiors with Mobile Phone Sensor Data," ISPRS International Journal of Geo- Information, Jun. 2015, 4(2):989-1012.

Schafer et al., "Automatic Generation of Topological Indoor Maps for Real-Time Map-Based Localization and Tracking," 2011 International Conference on Indoor Positioning and Indoor Navigation, 2011, 8 pages.

TheVerge.com [online], "Apple's survey app helps venues easily createindoor maps," Nov. 2, 2015, retrieved on Mar. 25, 2020, retreived from URL <https://www.theverge.com/2015/11/2/9657304/apple-indoor-mapping-survey-app>, 3 pages.

* cited by examiner

MAP ACCURACY

CROSS-REFERENCE TO RELATED APPLICATIONS

This application is a continuation of U.S. patent application Ser. No. 17/874,780, filed Jul. 27, 2022 and issued on Jan. 28, 2025 as U.S. Pat. No. 12,209,870, which is a continuation of U.S. patent application Ser. No. 16/831,111, filed Mar. 26, 2020 and issued on Aug. 23, 2022 as U.S. Pat. No. 11,425,533, which claims the benefit of U.S. Provisional Application No. 62/824,389, filed Mar. 27, 2019. The disclosures of the prior applications are considered part of (and are incorporated by reference in) the disclosure of this application.

TECHNICAL FIELD

This specification generally relates to verifying and improving the accuracy of digital maps of physical spaces, such as retail stores.

BACKGROUND

Digital maps of indoor and outdoor spaces have been used to help guide users as they move around those spaces. For example, digital maps have been generated and presented in applications that permit a user to zoom and scroll around the map, and in some instances, to view the user's current location superimposed at an appropriate location on the map. Items other than a user's current location can also be depicted on maps, such as presenting icons that identify places of interest for a user, such as stores, restaurants, and parks.

Computer-aided design (CAD) tools may be used for developing and maintaining a map that represents a physical space. When changes occur to the physical space (e.g., buildings or roads are built or demolished), corresponding changes are generally made to the map using the computer-aided design tools. For example, the aisles, shelves, and overall physical layout in a retail store can be digitally mapped out in a CAD file using CAD tools. When the physical layout of the retail store changes, such as aisles being rearranged, added, removed, or otherwise changed, the CAD tool can be used to update the map of the retail store to reflect those changes in the CAD file.

SUMMARY

This document generally describes computer systems, processes, program products, and devices for verifying and improving the accuracy of digital maps of physical spaces (e.g., retail stores, warehouses, or other facilities). Digital maps can be generated, maintained, and provided for a physical space, for example, to facilitate organization of the space, to facilitate location identification for various fixtures (e.g., shelves, racks, workstations, etc.), items (e.g., products), and other objects in the space, and to facilitate navigation throughout the space. Planogram data may also be associated with a digital map, in which labels can be assigned to mapped areas and elements to help identify various sections, departments, fixtures, and items. The digital map (e.g., including the planogram data) can be provided to workers and other users (e.g., on a computing device display) to help with tasks such as item location, inventory assessment, planning, remodeling, and other tasks. However, inaccurate map and/or planogram data can hinder such tasks. In general, generating and maintaining a digital map, and ensuring that the digital map, its planogram data, and a physical space are accurate and aligned, can be challenging. For example, for changes made to a physical space to be accurately reflected in a digital map of the space, the changes need to be communicated to the correct design personnel, who would then manually use digital design tools to update the corresponding map and/or planogram data. However, such a process can have many pitfalls, including system inefficiencies, timeliness, and human error. This document describes techniques, systems, processes, and devices for automatically detecting possible map discrepancies and for quickly correcting the discrepancies so that digital map accuracy, which can provide, for example, improved digital map generation processes that generate digital maps that more accurately reflect the current state of a physical space.

Such improved digital map generation processes can be performed using any of a variety of appropriate data sources, as described in greater detail below. For example, location information for users and other people travelling throughout a physical space can be used to infer the location of objects within the physical space. For instance, users can be inferred to travel paths around physical objects (instead of through physical objects), and aggregation of such travel paths (as well as other location information) can be used to identify where physical objects are located and where they are not located. In another example, location-based event information can be used to determine where physical objects are located. For instance, product scans and/or other actions that are associated with locations within a physical space can be used to locate physical objects within a physical space. Such location information can be combined with, for example, preexisting map data to improve upon and update the preexisting map data. For example, an existing map of a physical space can be combined with location information from users and events to improve upon and update the existing map. Additional and/or alternative techniques for generating and updating digital maps can be performed, as described throughout this document.

In some implementations, a method for improving a digital map may be performed by a computing system. The method includes receiving stored map data corresponding to a digital map, identifying a discrepancy between the digital map and a physical space which the digital map represents, updating the digital map to correct the identified discrepancy, and storing the updated digital map.

Other implementations of this aspect include corresponding computer systems, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other implementations may include any, all, or none of the following features. Identifying the discrepancy between the digital map and the physical space which the digital map represents may include receiving identified location coordinates for an item in the physical space, receiving a planogram location for the item, identifying map coordinates for the planogram location for the item, and determining that the identified location coordinates for the item in the physical space do not match the identified map coordinates for the planogram location for the item. The identified location coordinates may be based on a capture of the item performed by a single mobile computing device. The identified location coordinates may be based on aggregating captures of the item performed by multiple different mobile computing devices. Identifying the discrepancy between the digital map and the physical space which the digital map represents may include receiving device location data that has been collected by at least one device location sensor of a mobile computing device, determining a device path that represents a path of the mobile computing device through the physical space with respect to the digital map, identifying location boundaries of a fixture in the physical space, and determining that the device path intersects the fixture, based on the identified location boundaries. Identifying the discrepancy between the digital map and the physical space which the digital map represents may include receiving aggregated device location data that has been collected by multiple different mobile computing devices, identifying an area of the digital map that has not been occupied by any of the multiple different mobile computing devices, according to the aggregated device location data, and determining that the identified area of the digital map does not include a fixture. Updating the digital map to correct the identified discrepancy may include outputting a prompt to move a mobile computing device to a designated location with respect to a fixture in the physical space, receiving an indication that the mobile computing device is at the designated location, receiving device location coordinates that correspond to a current location of the mobile computing device when the mobile computing device is at the designated location, and updating a location of the fixture in the digital map. Outputting the prompt to move the mobile computing device to a designated location may include outputting a series of prompts to move the mobile computing device to respective corners of the fixture in the physical space. Updating the digital map to correct the identified discrepancy may include receiving, for an area of the digital map, identified location coordinates for an item in the physical space; receiving, for the area of the digital map, aggregated device location data that has been collected by multiple different mobile computing devices moving in an area of the physical space that corresponds to the area of the digital map; receiving fixture layout information that specifies a configuration for at least one fixture in the physical space; based on the identified location coordinates, aggregated device location data, and fixture layout information, determining fixture layout boundaries for a fixture; and updating the digital map to include the fixture in the area of the digital map. The method may further include providing the updated digital map for presentation on a device display.

The systems, devices, program products, and processes described throughout this document can, in some instances, provide one or more of the following advantages. Appropriate automated and semi-automated techniques can be used to quickly identify possible map discrepancies and to quickly correct the identified discrepancies. Accurate maps can be provided to customer devices, worker devices, and/or inventory systems, improving the efficiency of these users and/or systems. Accurate maps can also be automatically generated and continually updated without requiring manual interactions, such as identifying of changes to the physical layout or other manual inputs. This can permit for digital maps to be continually updated without human interaction, which can be particularly beneficial when physical spaces are undergoing frequent changes (e.g., retail store undergoing remodeling). Location boundaries can be automatically determined for a fixture in a facility, without collecting or entering data for the express purpose of defining the fixture location boundaries.

Other features, aspects and potential advantages will be apparent from the accompanying description and figures.

DESCRIPTION OF DRAWINGS

Like reference symbols in the various drawings indicate like elements.

DETAILED DESCRIPTION

This document describes technology that can verify and improve a map of a physical space, using various techniques for identifying a discrepancy between a physical space (e.g., a facility, such as a store, warehouse, office building, or another type of facility) and a map of the physical space, and for updating the map of the physical space to correct the discrepancy. In general, maintaining accurate maps of facilities may be challenging, since a facility which a map represents may be altered, with each alteration prompting a corresponding alteration to the map. For example, fixtures such as shelves, racks, workstations, or other relatively fixed objects may be moved, removed, added, and/or relabeled in a retail store, causing a corresponding store map to become inaccurate until it is later updated. Such inaccuracies can cause inefficiencies when the map is provided to customer devices, worker devices, and/or inventory systems. Communicating changes in physical spaces to design personnel and having the design personnel manually update the corresponding maps, for example, may be a cumbersome process. To solve the problem of maintaining updated maps when physical spaces are updated (or simply generating new maps for spaces), with minimal communication overhead and minimal delay, for example, appropriate automated and semi-automated techniques can be used to quickly identify possible map discrepancies and to quickly correct the identified discrepancies.

Figure 1A:
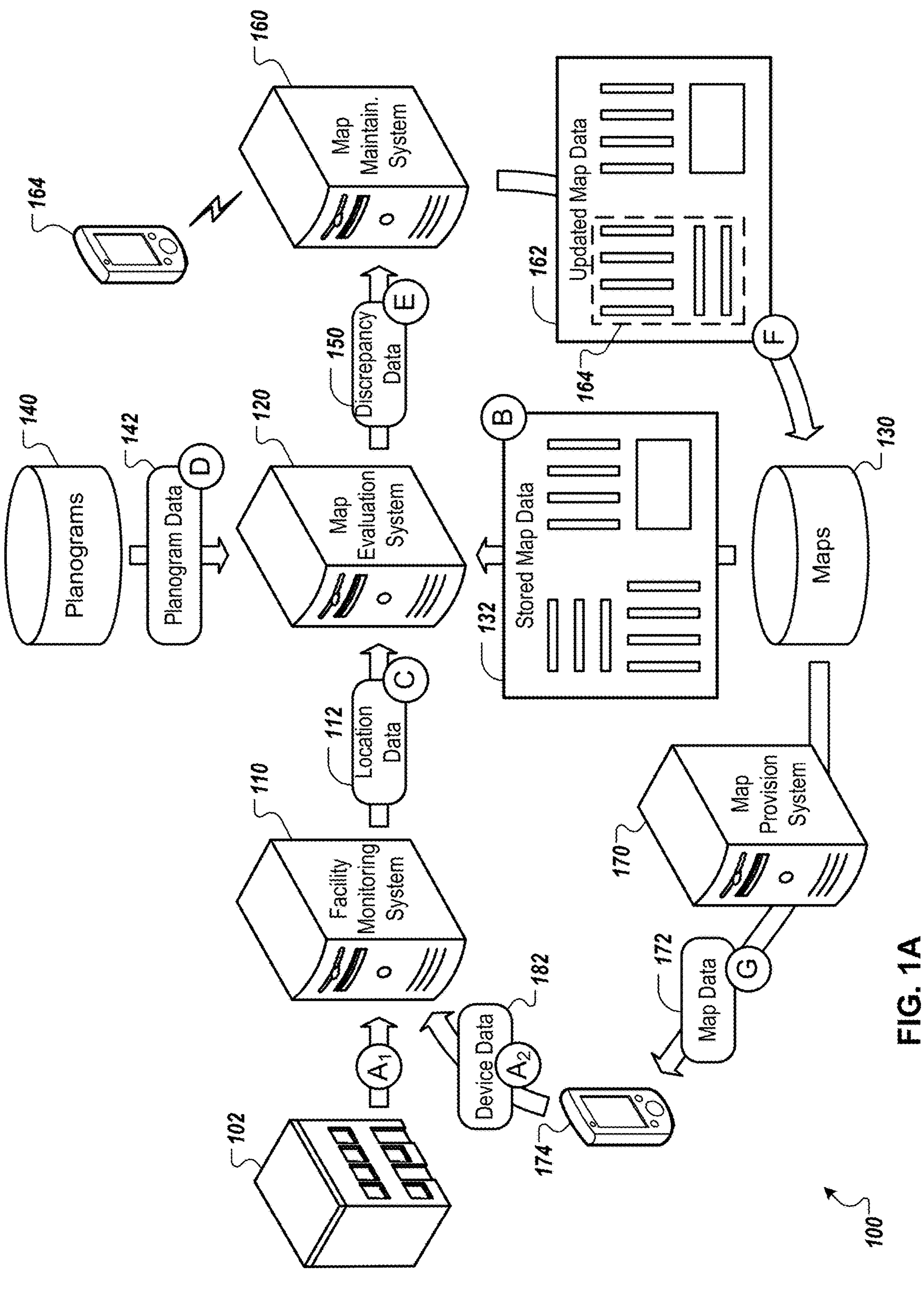
FIG. 1A is a conceptual diagram of an example system for verifying and improving a map of a physical space.

FIG. 1A is a conceptual diagram of an example system 100 for verifying and improving a map of a physical space.

In the depicted example, the system 100 includes a facility monitoring system 110, a map evaluation system 120, a map maintenance system 160 and a map provision system 170. In some examples, each of the systems 110, 120, 160, 170, can include various forms of computing servers, including, but not limited to network servers, web servers, or application servers, and/or can include various forms of computing devices, including, but not limited to, desktop computers, laptop computers, handheld computers, or two or more of these computing devices or other computing devices. In some examples, one or more of the systems 110, 120, 160, 170, can be split into multiple other systems. In some examples, two or more of the systems 110, 120, 160, 170, can be combined into a single system.

FIG. 1A also illustrates an example process flow for verifying and improving a map of a physical space, shown in stages (A) to (G). Stages (A) to (G) may occur in the illustrated sequence, or they may occur in a sequence that is different than in the illustrated sequence, and/or two or more stages (A) to (G) may be concurrent.

During stage ($A_1$), the facility monitoring system 110 optionally monitors a facility 102. For example, the facility 102 can be a building such as a retail store, a warehouse, an office, or another sort of building that includes an indoor space in which various fixtures (e.g., shelves, racks, workstations, or other relatively fixed objects) are located. To monitor the facility 102, for example, the facility monitoring system 110 can include and/or communicate with various data collection devices, that may include cameras, barcode scanners, radio frequency (RF) sensors, device location sensors (e.g., Global Positioning System (GPS) devices, Wi-Fi location tracking devices, etc.), and/or other suitable data collection components. For example, a worker in the facility 102 can use a mobile computing device that includes one or more device location sensors and object identification sensors (e.g., cameras, barcode scanners, RF scanners, etc.), and can execute an application (e.g., including same or similar features as applications described below with respect to the user device 174) to capture (and/or enter) object identifiers for various objects (e.g., products, fixtures, etc.) distributed throughout the facility 102. As another example, a robotic vehicle can include one or more device location sensors and object identification sensors, and can be used to travel throughout the facility 102 and collect object identification data. A current location of a device that identifies the object in the facility 102 may be assigned as the object's location by the facility monitoring system 110. In general, data collected by the facility monitoring system 110 may be considered to be trusted data with respect to a location of an object identified by a device being the object's actual location within the facility 102.

During stage ($A_2$), the facility monitoring system 110 optionally receives device data 182 from a user device 174. The user device 174, can be a mobile computing device such as a smartphone, a tablet, a personal digital assistant, or another suitable type of mobile computing device that includes one or more device location sensors and object identification sensors (e.g., cameras, barcode scanners, RF scanners, etc.). For example, the user device 174 can execute a user application (e.g., a product information application, a couponing application, or another sort of user application) which can be used to capture an identifier of an object (e.g., a product, a fixture, etc.) within the facility 102. In response to the capture of the object identifier, for example, the user device 174 can provide the device data 182 to the facility monitoring system 110 that indicates the captured object identifier and a location of the device at which the capture occurred. As another example, the user device 174 can execute a mapping application that periodically (e.g., once per second, twice per second, three times per second, or at another suitable time interval) determines a location of the device within the facility 102 without being associated with any particular object identifier in the facility 102, such that a current location of the device can be included as an icon on a map of the facility 102 presented by the device, and/or a device path throughout the facility may be determined. The location of the user device 174, for example, can be based on GPS data, Wi-Fi triangulation data, user-entered data, or other suitable location data, and can be provided after receiving appropriate permission from a device user. In general, data received by the facility monitoring system 110 from individual user devices 174 may be considered as untrusted data with respect to a location a single device that identifies an object being the object's actual location within the facility 102 (e.g., some users may scan a product at a location that is distant from the product's stored location), however aggregated data from multiple different user devices (e.g., using one or more clustering techniques) may be considered as trusted data. In general, data received by the facility monitoring system 110 that corresponds to a device's current location as the device moves throughout the facility 102 may be considered as trusted data.

Figure 1B:
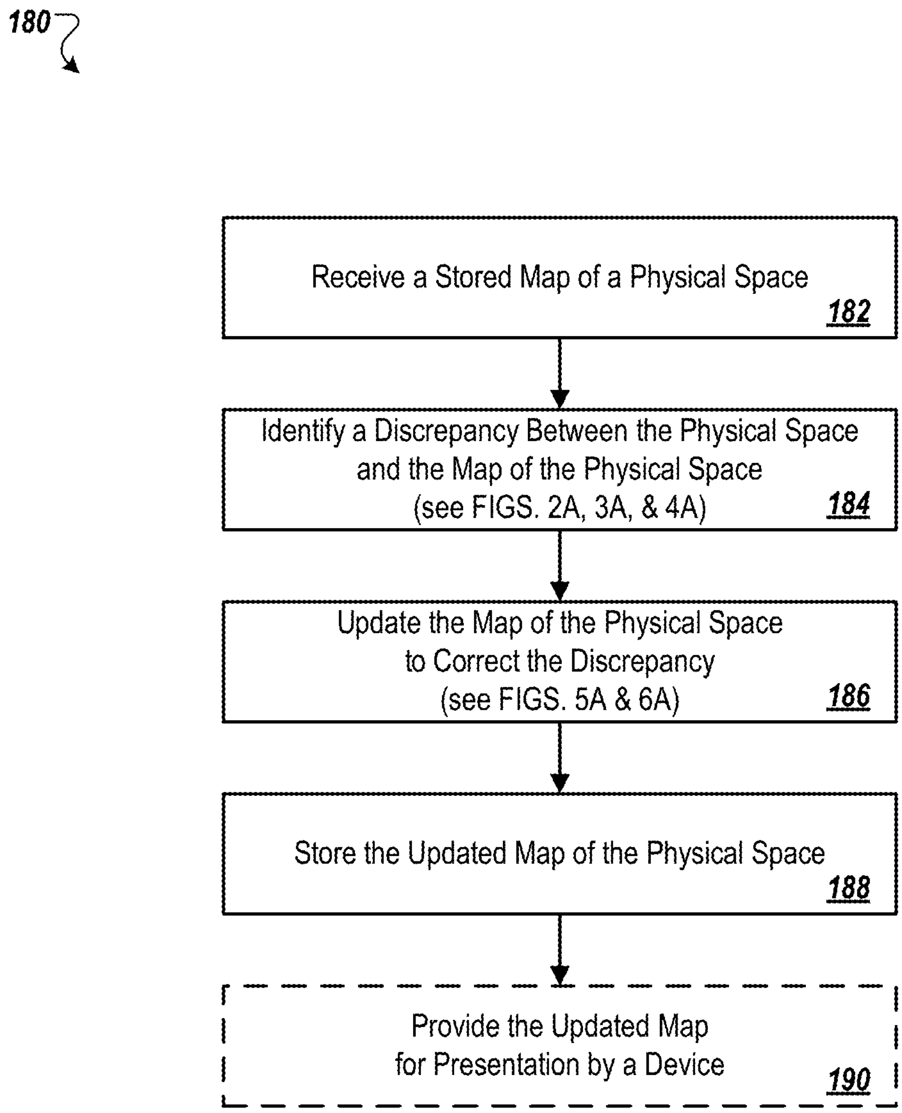
FIG. 1B shows an example process for verifying and improving a map of a physical space.

Referring now to FIG. 1B, an example process 180 for verifying and improving a map of a physical space is shown. The process 180 can be performed by components of the system 100, for example, and will be described with reference to FIG. 1A. However, other systems may be used to perform the same or similar process.

At box 182, a stored map of a physical space is received. Referring to FIG. 1A, for example, during stage (B), the map evaluation system 120 receives stored map data 132 from a maps data source 130 (e.g., a database, a file system, and/or a cached data source). For example, the map data 132 can include data that defines locations, sizes, and orientations of various fixtures (e.g., shelves, racks, workstations, or other relatively fixed objects), planned areas (e.g., sections, departments, etc.), walls, rooms, doorways, and other mapped objects and areas within the facility 102. In some implementations, map data may include and/or reference planogram data that provides map coordinates for various planogram locations (e.g., placement locations for items within a facility). In some implementations, map data may be provided in a computer file format generated by a software application used for designing a mapped space. For example, the map data 132 can be a computer-aided design (CAD) file (or another suitable file), or can be based on such a file.

During stage (C), for example, the map evaluation system 120 optionally receives location data 112 from the facility monitoring system 110. For example, the location data 112 can include object location data that corresponds to locations of various objects (e.g., items, fixtures, etc.) within the facility 102 as identified by the facility monitoring system 110 and/or user device(s) 174. As another example, the location data 112 can include device location data that corresponds to locations of one or more devices (e.g., mobile devices of the facility monitoring system 110 and/or user device(s) 174) as the devices move throughout the facility 102.

During stage (D), for example, the map evaluation system 120 optionally receives planogram data 142 from a planograms data source 140 (e.g., a database, a file system, and/or a cached data source). For example, the planogram data 142 can define various planogram locations that indicate one or more assigned placement locations for items (e.g., products) and/or fixtures within the facility 102. An assigned placement location, for example, can include a facility address, such as an aisle and a section of a retail store.

At box 184, a possible discrepancy between the physical space and the map of the physical space is identified. Based on the stored map data 132 for the facility 102, and based on one or more of the location data 112 and the planogram data 142 for the facility 102, for example, the map evaluation system 120 can determine whether the defined locations of the various fixtures, planned areas, walls, rooms, doorways, and other mapped objects and areas within the facility 102 according the stored map data 132 are accurate or inaccurate. Various techniques for identifying discrepancies are described below with respect to FIGS. 2A-B, FIGS. 3A-B, and FIGS. 4A-B.

Figure 2A:
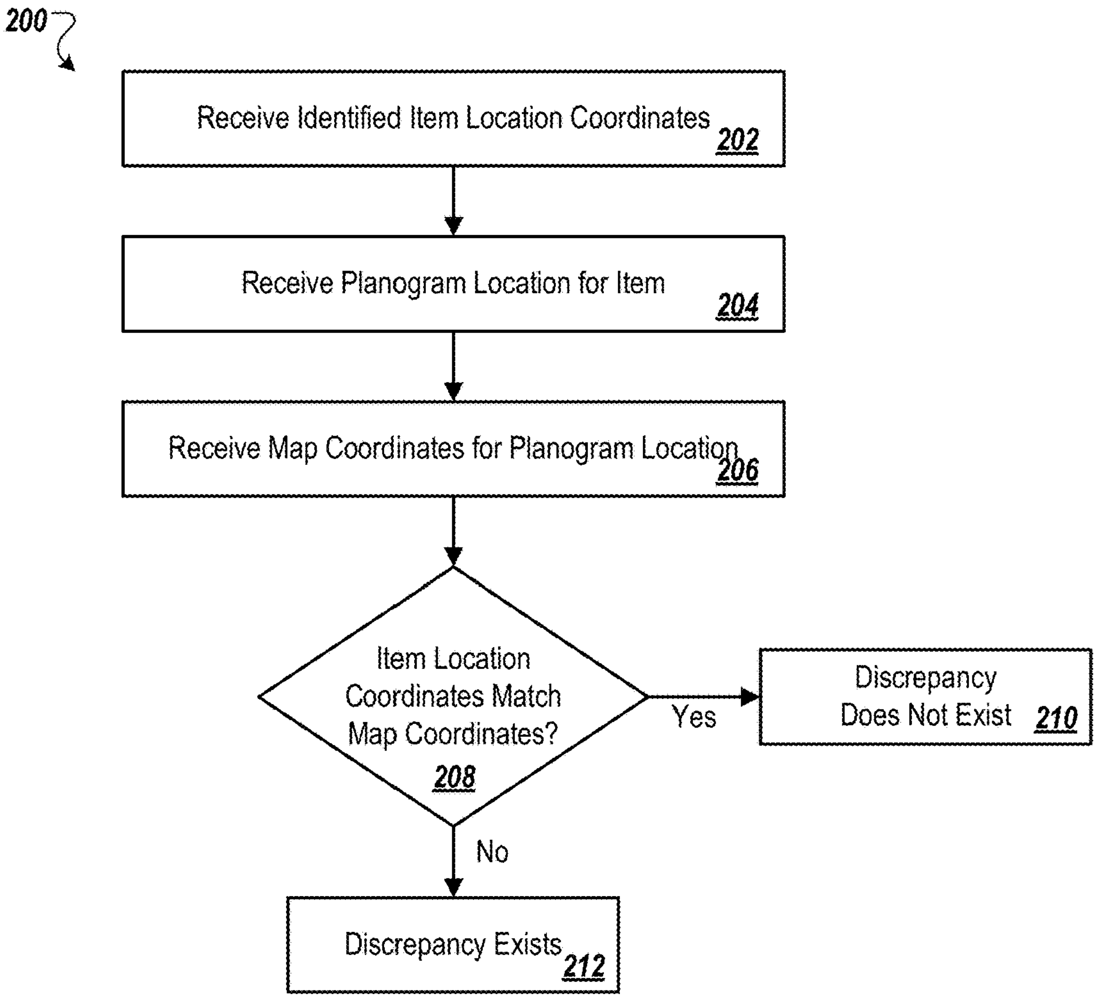
FIGS. 2A-B show an example process and example data for identifying a discrepancy between a physical space and a map of the physical space using item location data and planogram data.
Figure 2B:
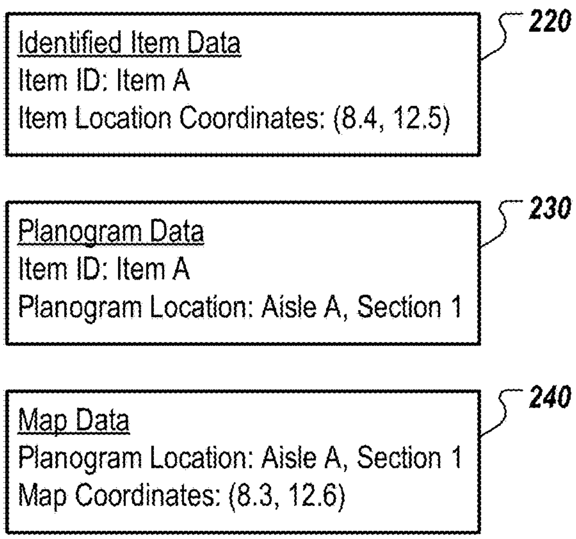

Referring now to FIGS. 2A-B, an example process 200 (FIG. 2A) and example data 220, 230, 240 (FIG. 2B) are shown for identifying a discrepancy between a physical space and a map of the physical space using item location data and planogram data. The process 200 can be performed by components of the system 100, for example, and will be described with reference to FIG. 1A. However, other systems may be used to perform the same or similar process.

At box 202, identified item location coordinates are received for an item. For example, the map evaluation system 120 can receive location data 112 from the facility monitoring system 110 that includes identified item data 220 (shown in FIG. 2B). The identified item data 220, for example, can be based on an item identifier capture (e.g., a scan of a product's barcode, a scan of a product's RF tag, a photograph of the product, or another sort of capture) performed by a device of the facility monitoring system 110 and/or aggregated item identifier captures performed by multiple different user devices 174. In the present example, the identified item data 220 includes an item identifier for an item in the facility 102 (e.g., Item A, a product on a store shelf) and item location coordinates corresponding to the item's location in the facility, according to a coordinate system (e.g., 8.4 meters along an X-axis, 12.5 meters along a Y-axis).

At box 204, a planogram location is received for the item. For example, the map evaluation system 120 can receive planogram data 142 from the planograms data source 140 that includes planogram data 230 (shown in FIG. 2B) for the item represented in the identified item data 220 (also shown in FIG. 2B). In some implementations, receiving a planogram location for an item may include using the item's identifier to reference a planogram data source. For example, the map evaluation system 120 can retrieve planogram data 230 from the planograms data source 140 for an item having a specified item identifier. In the present example, the planogram data 230 includes the specified item identifier (e.g., Item A), and a planogram location, such as an aisle and a section of a retail store (or another sort of facility address) at which the item is to be placed in the facility 102 (e.g., Aisle A, Section 1).

At box 206, map coordinates are received for the planogram location. For example, the map evaluation system 120 can receive stored map data 132 from the maps data source 130 that includes map data 240 (shown in FIG. 2B) for the planogram location represented in the planogram data 230 (also shown in FIG. 2B). In some implementations, receiving map coordinates for a planogram location may include referencing the planogram location in a map data source. For example, the stored map data 132 can include, for various planogram locations, corresponding map coordinates (e.g., according to an XY coordinate system). The map evaluation system 120, for example, can retrieve map data 240 from the maps data source 130 for a specified planogram location. In the present example, the map data 240 includes the specified planogram location (e.g., Aisle A, Section 1), and corresponding map coordinates for the planogram location in the facility 102 (e.g., 8.3 meters along an X-axis, 12.6 meters along a Y-axis).

At box 208, a determination is performed of whether the received item location coordinates match the received map coordinates. For example, the map evaluation system 120 can determine whether the item location coordinates in the identified item data 220 match the map coordinates in the map data 240. In some implementations, determining whether coordinates match may include determining whether item location coordinates and map coordinates are within a threshold distance of each other (e.g., one meter, two meters, five meters, or another suitable distance).

At box 210, if the received item location coordinates match the received map coordinates, a discrepancy does not exist. For example, if the item location coordinates included in the identified item data 220 match the map coordinates included in the map data 240 (e.g., the coordinates are within a threshold distance), a discrepancy does not exist in the map data 240.

At box 212, if the received item location coordinates do not match the received map coordinates, a possible discrepancy exists. For example, if the item location coordinates included in the identified item data 220 do not match the map coordinates included in the map data 240 (e.g., the coordinates are not within a threshold distance), a possible discrepancy exists in the map data 240. A source of the discrepancy, for example, may be in the identified item data 220, the planogram data 230, and/or the map data 240.

Figure 3A:
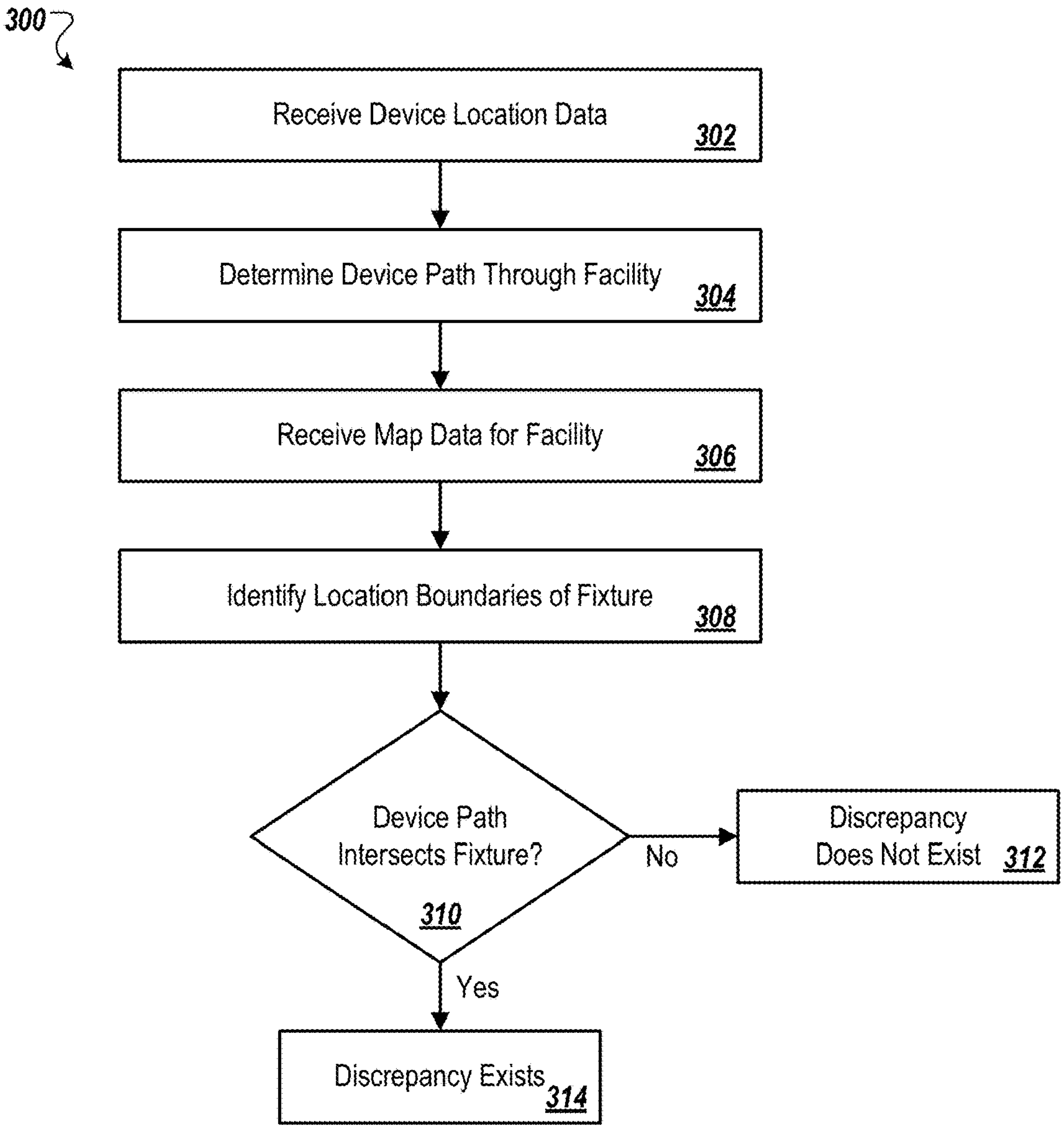
FIGS. 3A-B show an example process and example data for identifying a discrepancy between a physical space and a map of the physical space using device location data.
Figure 3B:
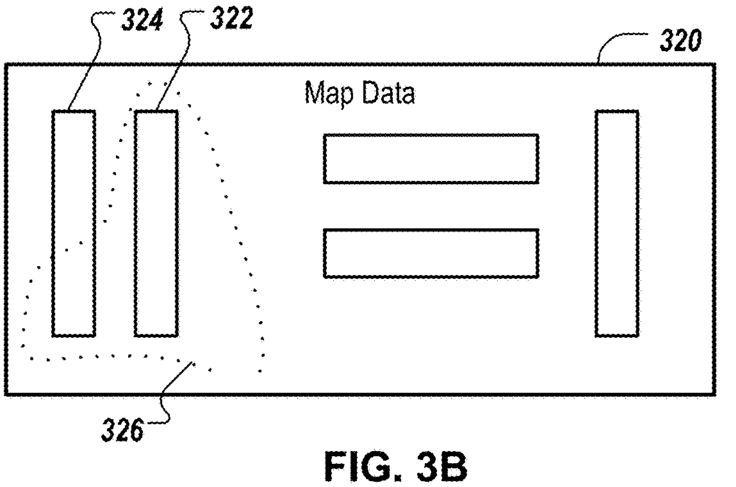

Referring now to FIGS. 3A-B, an example process 300 (FIG. 3A) and example data 320 (FIG. 3B) are shown for identifying a discrepancy between a physical space and a map of the physical space using device location data. The process 300 can be performed by components of the system 100, for example, and will be described with reference to FIG. 1A. However, other systems may be used to perform the same or similar process.

At box 302, device location data is received, and at box 304, one or more device paths through a facility are determined. For example, the map evaluation system 120 can receive location data 112 from the facility monitoring system 110 that defines one or more device paths that have been taken by mobile computing devices through the facility 102 (e.g., device path 326, shown in FIG. 3B). The device path(s), for example, can be based on device location data (e.g., GPS data, Wi-Fi triangulation data, or other suitable location data) from one or more data collection devices of the facility monitoring system 110 and/or one or more user devices 174. In the present example, the device path 326 includes a series of location coordinates for a device (e.g., based on an XY coordinate system), each location coordinate representing a position of the device within the facility 102 at a different point in time. In some implementations, determining a device path may include connecting consecutive points along the device path to form a continuous line. For example, the map evaluation system 120 can connect points associated with each consecutive device location (e.g., according to timestamps associated with the device locations) to generate the device path 326 that represents a device's movement through the facility 102.

At box 306, map data is received for a facility. For example, the map evaluation system 120 can receive stored map data 132 from the maps data source 130 that includes map data 320 (shown in FIG. 3B) for the facility 102. At box 308, location boundaries of one or more fixtures are identified. For example, the map evaluation system 120 can identify location boundaries of fixture 322 and fixture 324 (e.g., shelves in a retail store). In some implementations, identifying location boundaries of a fixture may include determining vertices and edges that define a shape that represents the fixture, according to a coordinate system for a map that includes the fixture.

At box 310, a determination is performed of whether one or more device paths intersect a fixture. For example, the map evaluation system 120 can determine whether the device path 326 intersects either, both of, or none of fixtures 322 and 324 (e.g., a mobile computing device has traversed an area corresponding to the fixtures in a map during a recent specified period of time). In some implementations, determining whether a device path intersects a fixture includes determining whether a line that represents the device path passes through an interior of a shape that represents the fixture.

At box 312, if one or more device paths do not intersect a fixture, a discrepancy does not exist. In the present example, the device path 326 does not pass through an interior of a shape that represents fixture 322, and a discrepancy does not exist in the map data 320 with respect to fixture 322.

At box 314, if one or more device paths intersect a fixture, a possible discrepancy exists. In the present example, the device path 326 passes through an interior of a shape that represents fixture 324, and a possible discrepancy exists in the map data 320 with respect to fixture 324. For example, the fixture 324 may have been installed or moved in the facility 102 without updating the stored map data 132 for the facility, causing the discrepancy.

Figure 4A:
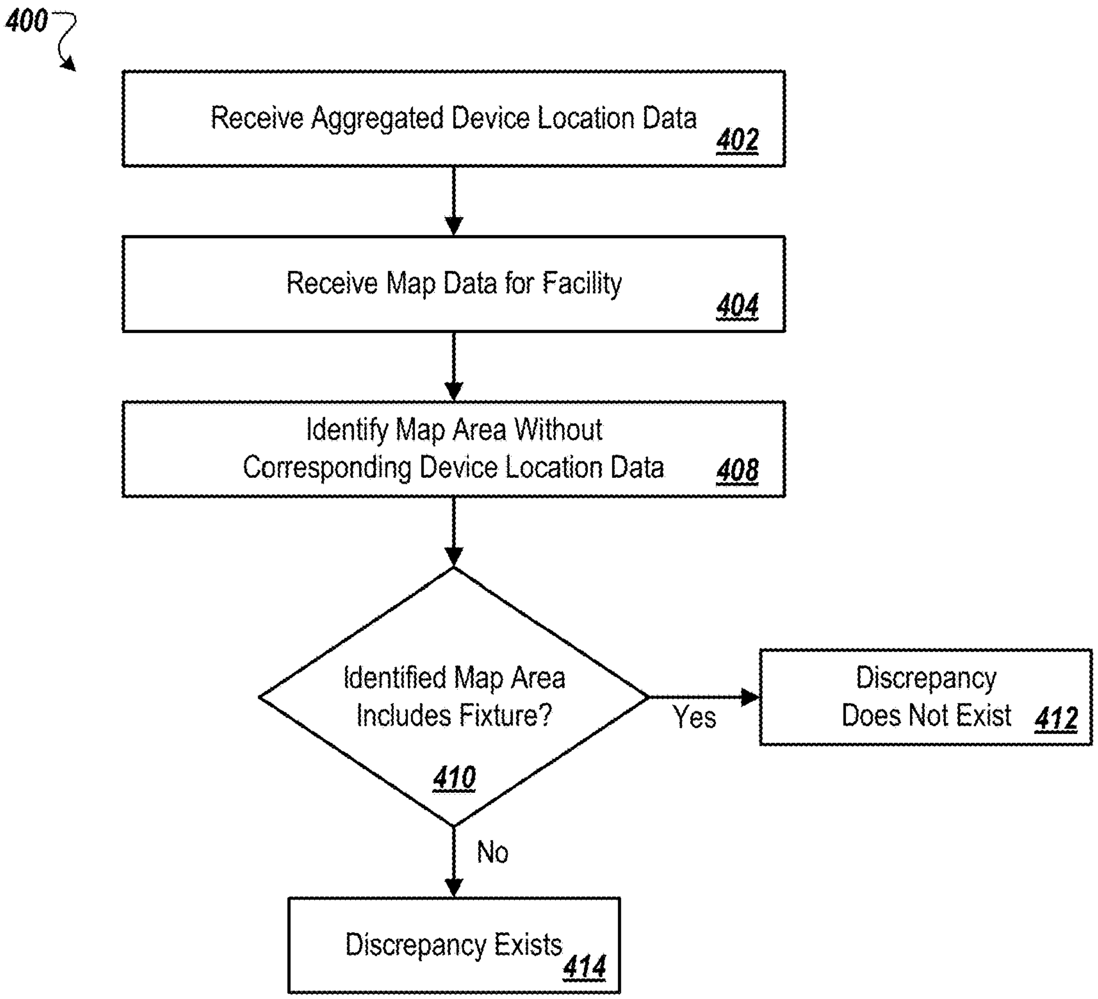
FIGS. 4A-B show an example process and example data for identifying a discrepancy between a physical space and a map of the physical space using aggregated device location data.
Figure 4B:
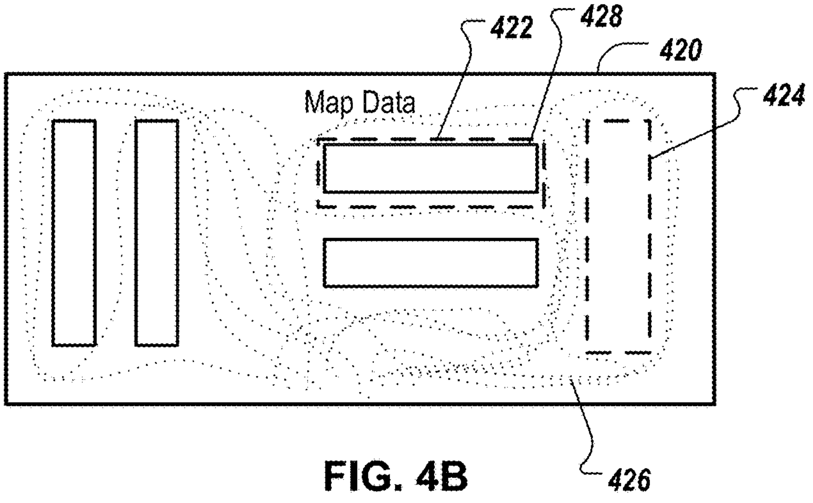

Referring now to FIGS. 4A-C, an example process 400 (FIG. 4A) and example data 420 (FIG. 4B) are shown for identifying a discrepancy between a physical space and a map of the physical space using aggregated device location data. The process 400 can be performed by components of the system 100, for example, and will be described with reference to FIG. 1A. However, other systems may be used to perform the same or similar process.

At box 402, aggregated device location data is received. For example, the map evaluation system 120 can receive location data 112 from the facility monitoring system 110 that defines multiple device paths through the facility 102 (e.g., multiple different device paths 426, shown in FIG. 4B). Device paths, for example, can be based on device location data (e.g., GPS data, Wi-Fi triangulation data, or other suitable location data) from multiple data collection devices of the facility monitoring system 110 and/or multiple different user devices 174. In the present example, each of the multiple device paths 426 includes a series of location coordinates for a respective device (e.g., based on an XY coordinate system), each location coordinate of a device path representing a position of the device within the facility 102 at a different point in time.

At box 404, map data is received for a facility. For example, the map evaluation system 120 can receive stored map data 132 from the maps data source 130 that includes map data 420 (shown in FIG. 4B) for the facility 102. At box 408, a map area without corresponding device location data is identified. For example, the map evaluation system 120 can identify map areas 422 and 424 (also shown in FIG. 4B) within the map data 420 as not including corresponding device location data according to the multiple device paths 426 (e.g., the map areas have not been occupied by any mobile computing devices during a recent specified period of time). In some implementations, identifying a map area without corresponding device location data may include identifying a shape having a minimum specified area (e.g., one square meter, two square meters, five square meters, or another suitable area) that does not include device location coordinates of any device path represented in the aggregated device location data. In the present example, neither map area 422 nor map area 424 includes device location coordinates of any of the multiple device paths 426.

At box 410, a determination is performed of whether the identified map area includes a fixture. For example, the map evaluation system 120 can determine whether either, both of, or none of map areas 422 and 424 include a fixture, according to the map data 420. In some implementations, determining whether a map area includes a fixture includes determining whether a shape that represents the fixture is completely within the map area, based on the size and position of the shape relative to the size and position of the map area.

At box 412, if the identified map area includes a fixture, a discrepancy does not exist. In the present example, the map area 422 includes fixture 428 (shown in FIG. 4B), and a discrepancy does not exist in the map data 420 with respect to the map area 422 and the fixture 428.

At box 414, if the identified map area does not include a fixture, a possible discrepancy exists. In the present example, the map area 424 does not include any fixture according to the map data 420, and a possible discrepancy exists in the map data 420 with respect to the map area 424. For example, a new fixture (not shown) may have been moved to the map area 424 of the facility 102 without updating the stored map data 132 for the facility, causing the discrepancy.

Referring again to FIG. 1A, if a discrepancy is identified between a physical space and a map of the physical space (e.g., using one or more of the techniques described with respect to FIGS. 2A-B, FIGS. 3A-B, and/or FIGS. 4A-B), for example, corresponding discrepancy data 150 can be provided to the map maintenance system 160 during stage (E). For example, the discrepancy data 150 can include location coordinates for a map area that includes a possible discrepancy, an identifier for a fixture that is associated with a possible discrepancy, and/or a planogram location that is associated with a possible discrepancy.

Referring again to FIG. 1B, at box 186, the map of the physical space is updated to correct the discrepancy. For example, the map maintenance system 160 can use various techniques for updating the stored map data 132 of the facility 102, as described below with reference to FIGS. 5A-B and FIGS. 6A-B.

Figure 5A:
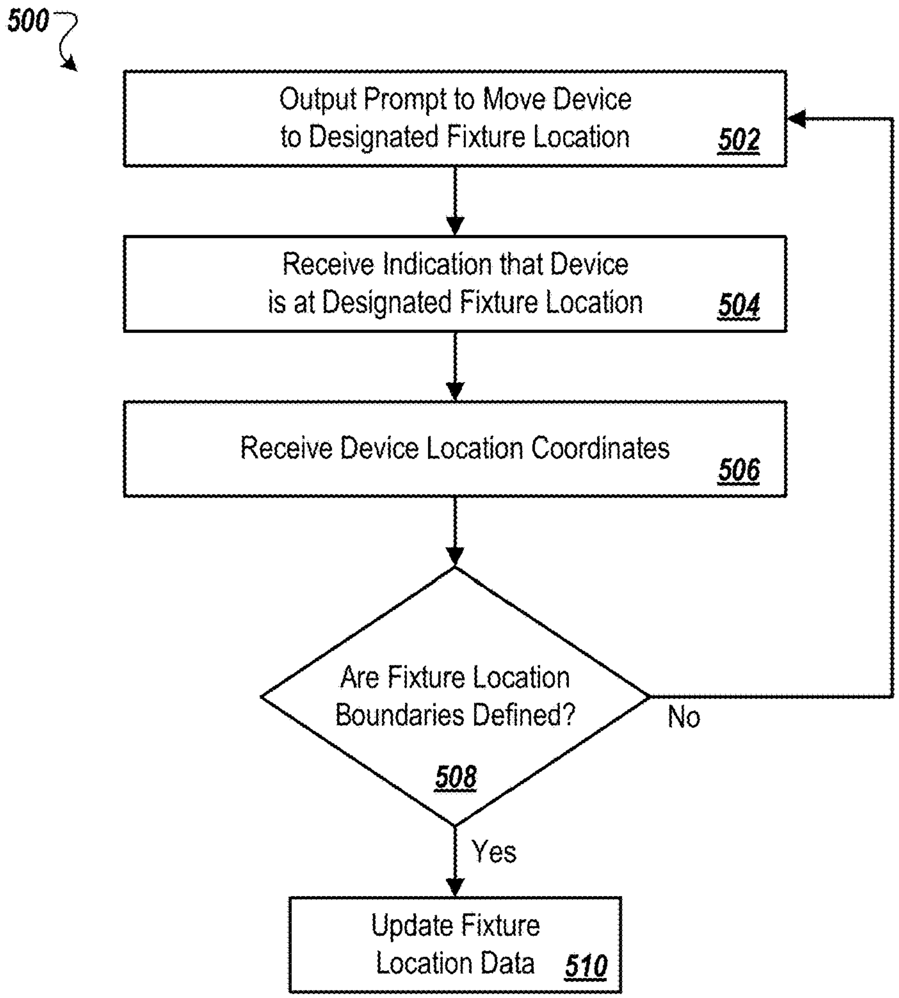
FIGS. 5A-B show an example process and example data for updating a map of a physical space to correct a discrepancy using device location data.
Figure 5B:
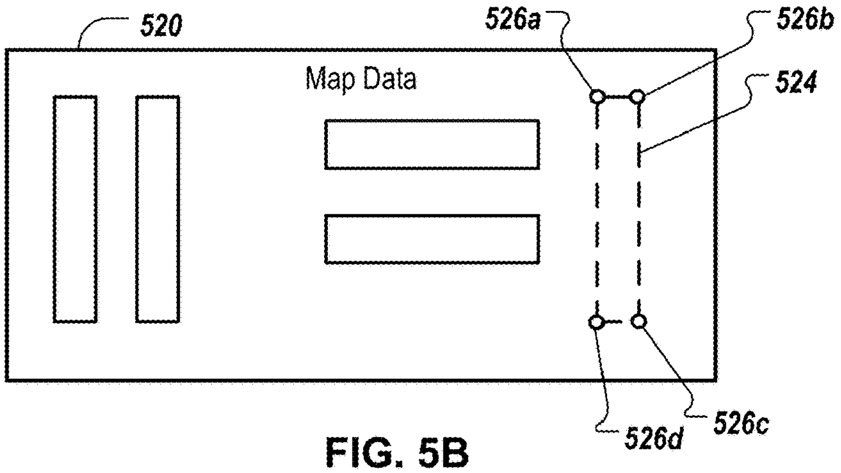

Referring now to FIGS. 5A-B, an example process 500 (FIG. 5A) and example data 520 (FIG. 5B) are shown for updating a map of a physical space to correct a discrepancy using device location data. The process 500 can be performed by components of the system 100, for example, and will be described with reference to FIG. 1A. However, other systems may be used to perform the same or similar process. In general, the process 500 can be used to determine fixture location boundaries for a fixture in a facility by collecting or entering data for the express purpose of defining the fixture location boundaries.

At box 502, a prompt is output to move a device to a designated fixture location. For example, the map maintenance system 160 can include and/or communicate with various data collection devices, that may include cameras, barcode scanners, radio frequency (RF) sensors, device location sensors (e.g., Global Positioning System (GPS) devices, Wi-Fi location tracking devices, etc.), and/or other suitable data collection components. For example, a worker in the facility 102 can use mobile computing device 164 that includes one or more device location sensors, and executes a fixture definition application to facilitate defining location coordinates for fixtures for use in updating a map of the facility. The mobile computing device 164, for example, can provide an audible and/or visual prompt for its user to move to a specified map area that includes a possible discrepancy, a specified fixture that is associated with a possible discrepancy, and/or a planogram location that is associated with a possible discrepancy. In the present example, the mobile computing device 164 prompts its user to move to the northwest corner of a fixture in the facility 102.

At box 504, an indication is received that the mobile computing device is at the specified fixture location. In the present example, the user of the mobile computing device 164 can provide device input (e.g., a spoken command, a control selection using a touch screen, or another suitable type of device input) when the device is at the northwest corner of the specified fixture. At box 506, device location coordinates are received. For example, the mobile computing device 164 and/or the map maintenance system can receive device location coordinates (e.g., according to an XY coordinate system) that correspond to a current location of the device when the device input is provided. In the present example, the mobile computing device 164 receives device location coordinates 526*a* corresponding to the northwest corner of the specified fixture, and the device provides the coordinates to the map maintenance system 160.

At box 508, a determination is performed of whether fixture location boundaries have been defined. For example, the map maintenance system 160 can reference fixture layout information that specifies, for a particular type of fixture (e.g., an aisle, a rack, or another type of fixture), fixture locations for which location coordinates are to be determined in order to define the fixture location boundaries. In the present example, device location coordinates 526*a-d* (e.g., each of four different corners) are to be determined in order to define fixture location boundaries 524 for the specified fixture.

If fixture location boundaries have not yet been defined, the process 500 continues at box 502. In the present example, fixture location boundaries have not yet been defined for the specified fixture, and the process continues until device location coordinates 526*b-d* are received for each of the three remaining corners of the specified fixture. If fixture location boundaries have been defined, fixture location data is updated at box 510. For example, the map maintenance system 160 can update the stored map data 132 to include the fixture location boundaries 524 of the specified fixture.

Figure 6A:
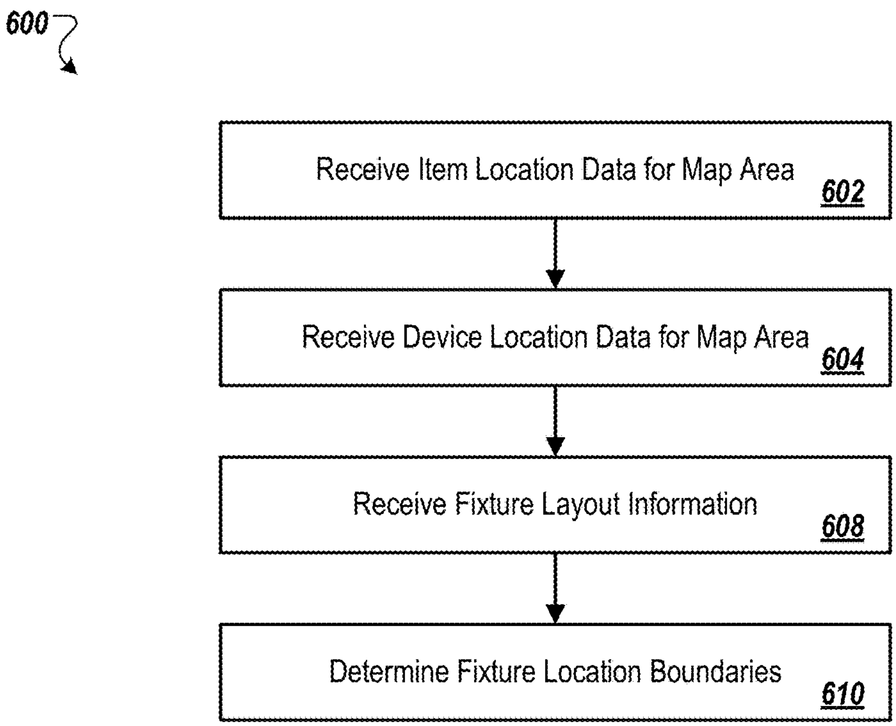
FIGS. 6A-B show an example process and example data for updating a map of a physical space to correct a discrepancy using item location data, device location data, and fixture layout information.
Figure 6B:
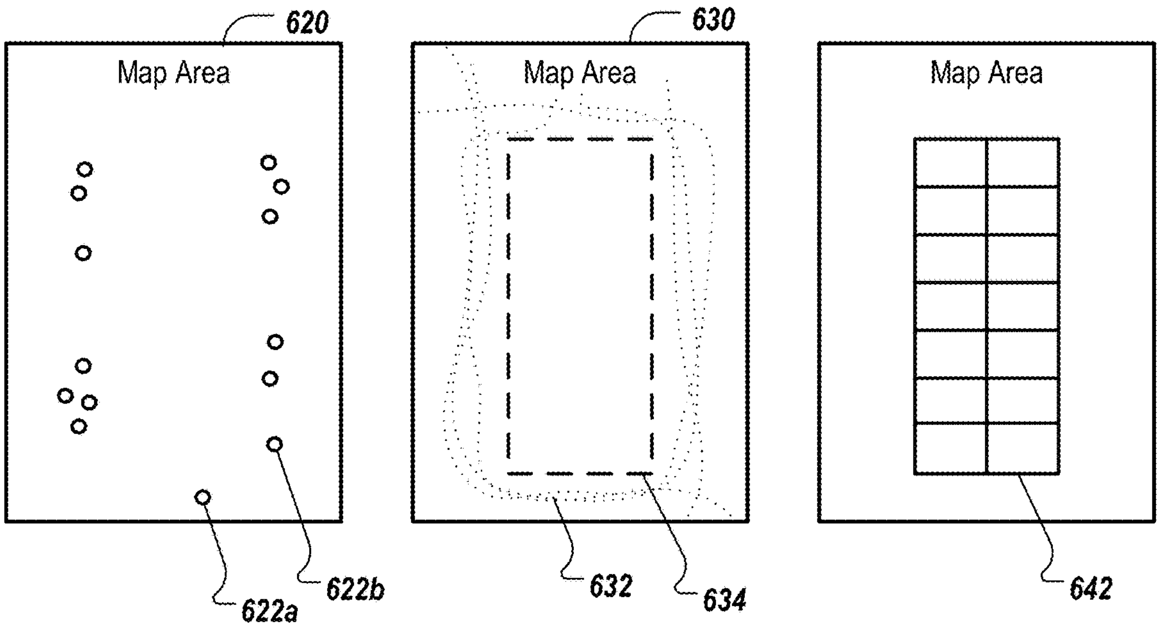

Referring now to FIGS. 6A-B, and example process 600 (FIG. 6A) and example data 620 and 630 (FIG. 6B) are shown for updating a map of a physical space to correct a discrepancy using item location data, device location data, and fixture layout information. The process 600 can be performed by components of the system 100, for example, and will be described with reference to FIG. 1A. However, other systems may be used to perform the same or similar process. In general, the process 600 can be used to automatically determine fixture location boundaries for a fixture in a facility, without collecting or entering data for the express purpose of defining the fixture location boundaries.

At box 602, item location data is received for a map area. For example, the map maintenance system 160 can receive item location data 620 (shown in FIG. 6B) that corresponds to captures of item identifiers (e.g., a scan of a product's barcode, a scan of a product's RF tag, a photograph of the product, or another sort of capture) performed by a device of the facility monitoring system 110 and/or aggregated item identifier captures performed by multiple different user devices 174. In the present example, the item location data 620 includes item location coordinates 622*a*, 622*b*, etc., (shown in FIG. 6B) indicating that items (e.g., products) are located within the map area, and indicating that one or more fixtures for storing the items are also likely within the map area.

At box 604, device location data is received for a map area. For example, the map maintenance system 160 can receive aggregated device location data 630 that defines multiple device paths associated with multiple data collection devices of the facility monitoring system 110 and/or multiple user devices 174. In the present example, the device location data 630 includes device paths 632 (shown in FIG. 6B), indicating that device users have moved around region 634 (also shown in FIG. 6B), and indicating that one or more fixtures are likely within the region of the map area.

At box 608, fixture layout information is received. For example, the map maintenance system 160 can receive fixture layout information that specifies a configuration for fixtures located within a facility. The fixture layout information, for example, can define fixture sizes, shapes, orientations, arrangements, and other suitable layout information.

At box 610, fixture location boundaries are determined. For example, the map maintenance system 160 can determine fixture location boundaries based on the received item location data 620 for a map area, received device location data 630 for the map area, and fixture layout information for a facility that includes the map area. In the present example, fixture location boundaries 642 (shown in FIG. 6B) can be determined for a map area of the facility 102 that likely includes one or more fixtures (e.g., based on the received item location data 620), that fits within the region 634 (e.g., based on the received device location data 630), and that conforms to the received fixture layout information. For example, the received fixture layout information can specify that fixtures for storing items corresponding to the item location coordinates 622*a*, 622*b*, etc., and fitting within a region having a similar size, shape, and orientation to the region 634 are generally associated with a particular configuration, such as an aisle that includes two parallel rows of sections, each section being of a specified size and shape.

Referring again to FIG. 1A, one or more updates to a map of a physical space to correct a discrepancy (e.g., using one or more of the techniques described with respect to FIGS. 5A-B and/or FIGS. 6A-B), for example, can be provided by the map maintenance system 160 as updated map data 162 during stage (F). In the present example, the updated map data 162 includes one or more map updates 164 that specify current locations and orientations of fixtures within the facility 102.

Referring again to FIG. 1B, at box 188, the updated map of the physical space is stored. For example, the updated map data 162 including the one or more map updates 164 can be stored in the maps data source 130.

At box 190, the updated map is optionally provided for presentation by a device. During stage (G), for example, the map provision system 170 can access the maps data source 130 and provide map data 172 corresponding to a most recent version of a map of the facility 102 (e.g., the updated map data 162) for presentation by the user device 174. The map data 172, for example, can be used by a mapping application executed by the user device 174 to facilitate navigation through the facility 102, an application executed by a computing device included in (or in communication with) the facility monitoring system 110 and/or the map maintenance system 160, or an application executed by another system.

Figure 7:
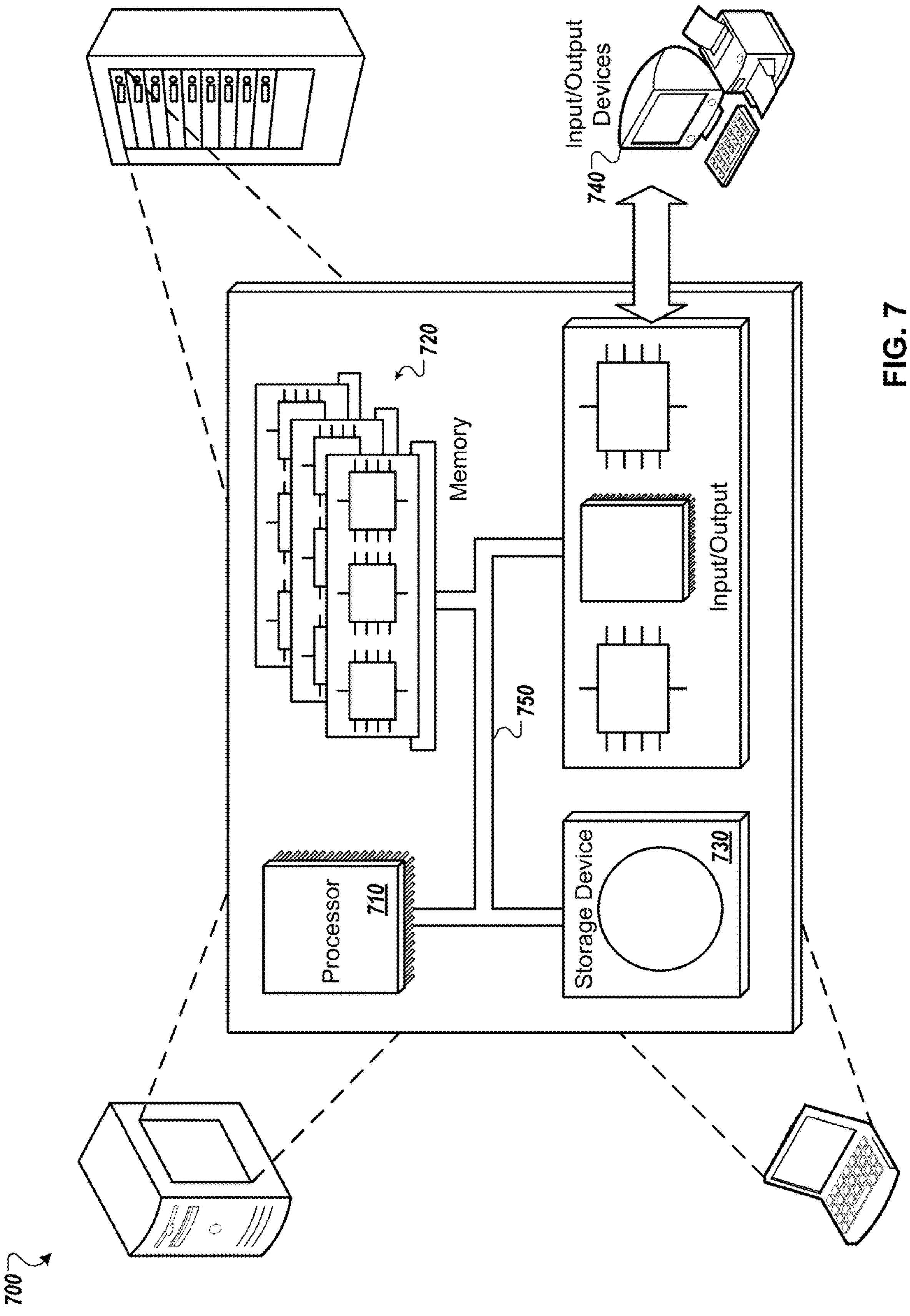
FIG. 7 is a schematic diagram that shows an example of a computing system.

FIG. 7 is a schematic diagram that shows an example of a computing system 700. The computing system 700 can be used for some or all of the operations described previously, according to some implementations. The computing system 700 includes a processor 710, a memory 720, a storage device 730, and an input/output device 740. Each of the processor 710, the memory 720, the storage device 730, and the input/output device 740 are interconnected using a system bus 750. The processor 710 is capable of processing instructions for execution within the computing system 700. In some implementations, the processor 710 is a single-threaded processor. In some implementations, the processor 710 is a multi-threaded processor. The processor 710 is capable of processing instructions stored in the memory 720 or on the storage device 730 to display graphical information for a user interface on the input/output device 740.

The memory 720 stores information within the computing system 700. In some implementations, the memory 720 is a computer-readable medium. In some implementations, the memory 720 is a volatile memory unit. In some implementations, the memory 720 is a non-volatile memory unit.

The storage device 730 is capable of providing mass storage for the computing system 700. In some implementations, the storage device 730 is a computer-readable medium. In various different implementations, the storage device 730 may be a floppy disk device, a hard disk device, an optical disk device, or a tape device.

The input/output device 740 provides input/output operations for the computing system 700. In some implementations, the input/output device 740 includes a keyboard and/or pointing device. In some implementations, the input/output device 740 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A computer-implemented method for improving a digital map for a facility, the method comprising:

receiving, by a computing system, stored map data corresponding to the digital map for the facility;

identifying, by the computing system, a discrepancy between the digital map and the facility which the digital map represents, wherein identifying the discrepancy comprises:

(i) receiving a series of device location coordinates of a mobile computing device over time, (ii) determining a device path that represents a path of the mobile computing device through the facility with respect to the digital map, based on the series of device location coordinates, (iii) identifying location boundaries of a given fixture in the facility according to the digital map, and (iv) determining that the device path intersects the given fixture, based on the identified location boundaries;

in response to identifying the discrepancy between the digital map and the facility which the digital map represents, updating, by the computing system, the digital map to correct the identified discrepancy, wherein updating the digital map comprises (i) determining actual location boundaries of the given fixture in the facility, and (ii) updating the digital map to include the actual location boundaries of the given fixture; and storing, by the computing system, the updated digital map.

2. The computer-implemented method of claim 1, wherein the series of device location coordinates have been collected by at least one device location sensor of the mobile computing device.

3. The computer-implemented method of claim 1, wherein identifying actual location boundaries of the given fixture in the facility comprises:

outputting a series of prompts to move a mobile worker device to designated locations on a perimeter of the fixture in the facility; and for each of the series of prompts, (i) receiving an indication that the mobile worker device is at a designated location, and (ii) receiving device location coordinates that correspond to a current location of the mobile worker device when the mobile worker device is at the designated location, in response to device input received at the mobile worker device;

wherein the actual location boundaries of the given fixture are determined based on a series of received device location coordinates from the mobile worker device.

4. The computer-implemented method of claim 1, further comprising providing the updated digital map for presentation on a device display.

5. The computer-implemented method of claim 1, wherein each of the device location coordinates of the series of device location coordinates represents a position of the mobile computing device at a different point in time.

6. The computer-implemented method of claim 5, wherein determining the device path of the mobile computing device comprises connecting each of the device location coordinates to form a continuous line.

7. The computer-implemented method of claim 1, wherein identifying location boundaries of the given fixture comprises determining vertices and edges that define a shape that represents the fixture, according to a coordinate system of the digital map.

8. The computer-implemented method of claim 7, wherein determining that the device path intersects the given fixture comprises determining that a line that represents the device path passes through an interior of the shape that represents the fixture.

9. The computer-implemented method of claim 1, wherein identifying actual location boundaries of the given fixture in the facility comprises:

receiving identified location coordinates for an item in the facility;

receiving, for an area of the digital map that corresponds to the received identified location coordinates for the item in the facility, device location data that has been collected by multiple different mobile computing devices moving in an area of the facility that corresponds to the area of the digital map; and receiving fixture layout information that specifies a configuration of the given fixture;

wherein the actual location boundaries of the given fixture are determined based on the identified location coordinates, the device location data, and the fixture layout information.

10. The computer-implemented method of claim 9, wherein the identified location coordinates for the item are received from at least one of the multiple different mobile computing devices, in response to a capture of an identifier of the item by the at least one of the multiple different mobile computing devices.

11. A computing system comprising:

one or more data processing apparatuses including one or more processors, memory, and storage devices storing instructions that, when executed, cause the one or more processors to perform operations for improving a digital map for a facility, the operations comprising:

receiving, by the computing system, stored map data corresponding to the digital map for the facility;

identifying, by the computing system, a discrepancy between the digital map and the facility which the digital map represents, wherein identifying the discrepancy comprises:

(i) receiving a series of device location coordinates of a mobile computing device over time, (ii) determining a device path that represents a path of the mobile computing device through the facility with respect to the digital map, based on the series of device location coordinates, (iii) identifying location boundaries of a given fixture in the facility according to the digital map, and (iv) determining that the device path intersects the given fixture, based on the identified location boundaries;

in response to identifying the discrepancy between the digital map and the facility which the digital map represents, updating, by the computing system, the digital map to correct the identified discrepancy, wherein updating the digital map comprises (i) determining actual location boundaries of the given fixture in the facility, and (ii) updating the digital map to include the actual location boundaries of the given fixture; and storing, by the computing system, the updated digital map.

12. The computing system of claim 11, wherein the series of device location coordinates have been collected by at least one device location sensor of the mobile computing device.

13. The computing system of claim 11, wherein identifying actual location boundaries of the given fixture in the facility comprises:

outputting a series of prompts to move a mobile worker device to designated locations on a perimeter of the fixture in the facility; and for each of the series of prompts, (i) receiving an indication that the mobile worker device is at a designated location, and (ii) receiving device location coordinates that correspond to a current location of the mobile worker device when the mobile worker device is at the designated location, in response to device input received at the mobile worker device;

wherein the actual location boundaries of the given fixture are determined based on a series of received device location coordinates from the mobile worker device.

14. The computing system of claim 11, the operations further comprising providing the updated digital map for presentation on a device display.

15. The computing system of claim 11, wherein each of the device location coordinates of the series of device location coordinates represents a position of the mobile computing device at a different point in time.

16. The computing system of claim 15, wherein determining the device path of the mobile computing device comprises connecting each of the device location coordinates to form a continuous line.

17. The computing system of claim 11, wherein identifying location boundaries of the given fixture comprises determining vertices and edges that define a shape that represents the fixture, according to a coordinate system of the digital map.

18. The computing system of claim 17, wherein determining that the device path intersects the given fixture comprises determining that a line that represents the device path passes through an interior of the shape that represents the fixture.

19. The computing system of claim 11, wherein identifying actual location boundaries of the given fixture in the facility comprises:

receiving identified location coordinates for an item in the facility;

receiving, for an area of the digital map that corresponds to the received identified location coordinates for the item in the facility, device location data that has been collected by multiple different mobile computing devices moving in an area of the facility that corresponds to the area of the digital map; and receiving fixture layout information that specifies a configuration of the given fixture;

wherein the actual location boundaries of the given fixture are determined based on the identified location coordinates, the device location data, and the fixture layout information.

20. The computing system of claim 19, wherein the identified location coordinates for the item are received from at least one of the multiple different mobile computing devices, in response to a capture of an identifier of the item by the at least one of the multiple different mobile computing devices.

* * * * *